(12) United States Patent
Hara (10) Patent No.: US 7,905,805 B2
(45) Date of Patent: Mar. 15, 2011

(54) TENSION DEVICE OF BICYCLE DERAILLEUR

(75) Inventor: Nobukatsu Hara, Izumisano (JP)

(73) Assignee: Shimano Inc., Osaka (JP)

( * ) Notice: Subject to any disclaimer, the term of this patent is extended or adjusted under 35 U.S.C. 154(b) by 456 days.

(21) Appl. No.: 12/101,673

(22) Filed: Apr. 11, 2008

(65) Prior Publication Data

US 2009/0258738 A1 Oct. 15, 2009

(51) Int. Cl.
*F16H 61/00* (2006.01)
(52) U.S. Cl. ............... 474/81; 474/92; 474/115; 474/117
(58) Field of Classification Search ............... 474/81–82, 474/112–115, 117
See application file for complete search history.

(56) References Cited

U.S. PATENT DOCUMENTS

| | | | |
|---|---|---|---|
| 3,121,575 A | | 2/1964 | Bourgi |
| 4,023,424 A | * | 5/1977 | Ryan et al. ...................... 474/80 |
| 5,213,549 A | * | 5/1993 | Blanchard ...................... 474/81 |
| 6,135,903 A | | 10/2000 | Savard |
| 6,159,118 A | * | 12/2000 | Campbell ...................... 474/78 |
| 6,793,598 B1 | | 9/2004 | Savard |

FOREIGN PATENT DOCUMENTS

| | | |
|---|---|---|
| DE | 624501 | 1/1936 |
| DE | 665138 | 9/1938 |
| DE | 743545 | 6/1944 |
| DE | 828063 | 1/1952 |
| DE | 832555 | 2/1952 |
| DE | 3232251 | 3/1984 |
| FR | 69.40495 | 7/1971 |
| FR | 2508408 | 12/1982 |
| FR | 2759968 | 8/1998 |
| JP | 60-7277 | 3/1985 |
| JP | 60-19034 | 6/1985 |
| WO | WO 93/01967 | 2/1993 |

* cited by examiner

*Primary Examiner* — Sang Kim
(74) *Attorney, Agent, or Firm* — Ditthavong Mori & Steiner, P.C.

(57) ABSTRACT

A tension device for a drive chain of a bicycle including a first pulley having a first rotational axis swingable around a swing center, and a second pulley having a second rotational axis movable along a movable direction to change a distance between the first rotational axis and the second rotational axis. The first pulley is arranged to be forced around the swing center to apply tension to the drive chain, and the second pulley is arranged to be forced along the moving direction to apply tension to the drive chain.

20 Claims, 8 Drawing Sheets

TENSION DEVICE OF BICYCLE DERAILLEUR

BACKGROUND OF THE INVENTION

1. Field of the Invention

The present invention relates to a device used to tension a drive chain of a bicycle during gear changing.

2. Discussion of the Background

Many bicycles include a transmission device that allows the bicycle to change between multiple gears. Such transmission devices can include a rear derailleur device that includes both a gear changing device and a tension device that are incorporated together as a unit. The gear changing device is used to shift from one gear to another gear by guiding the drive chain of the bicycle to engage with one sprocket of a set of plural sprockets that each provide a different mechanical advantage between an input from a rider to pedals of the bicycle and an output to a rear wheel of the bicycle. The sprockets provide a different mechanical advantage based on a different diameter size of each sprocket. However, as the gears are shifted by changing engagement of the drive chain from one sprocket to another sprocket, the drive chain will naturally slacken, which could allow the chain to disengage from the sprocket, or tighten, which could cause the chain to break, due to the diameter difference from one sprocket to another. Thus, the tension device is provided to account for this phenomenon and maintain the tension of the drive chain as the gears of bicycle are shifted.

The inventors of the present invention have determined that numerous improvements can be made to known designs of bicycle derailleurs.

SUMMARY OF THE INVENTION

The present invention advantageously provides an embodiment thereof in which a tension device for a drive chain of a bicycle includes a first pulley having a first rotational axis swingable around a swing center, and a second pulley having a second rotational axis movable along a movable direction to change a distance between the first rotational axis and the second rotational axis. The first pulley is arranged to be forced around the swing center to apply tension to the drive chain, and the second pulley is arranged to be forced along the moving direction to apply tension to the drive chain.

The present invention also advantageously provides an embodiment thereof in which a derailleur device for a drive chain of a bicycle includes a gear changing device configured to change a sprocket to which the drive chain is engaged, and a tension device. The tension device includes a first pulley having a first rotational axis and arranged to be forced to apply tension to the drive chain, and a second pulley having a second rotational axis and arranged to be forced to apply tension to the drive chain, where a distance between the first rotational axis and the second rotational axis is variable.

The present invention further advantageously provides an embodiment thereof in which a tension device for a drive chain of a bicycle includes a first pulley having a first rotational axis swingable around a swing center, and a second pulley having a second rotational axis movable along a substantially straight line. The first pulley is arranged to be forced around the swing center to apply tension to the drive chain, and the second pulley is arranged to be forced along the substantially straight line to apply tension to the drive chain.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EMBODIMENTS OF THE INVENTION

Embodiments of the present invention will be described hereinafter with reference to the accompanying drawings. In the following description, the constituent elements having substantially the same function and arrangement are denoted by the same reference numerals, and repetitive descriptions will be made only when necessary.

Figure 1:
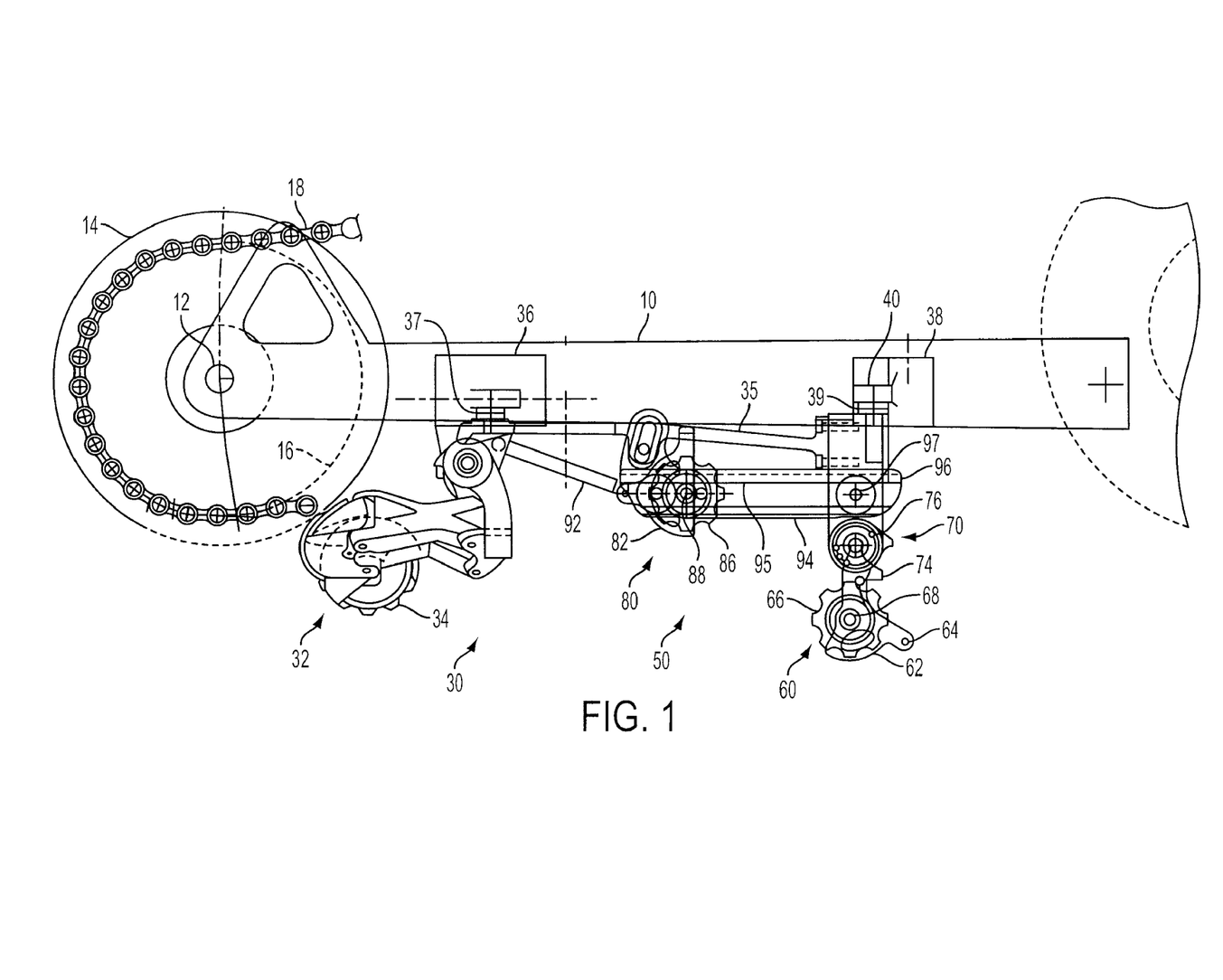
FIG. 1 is a schematic view of a rear derailleur device of a bicycle including a gear changing device and a tension device, according to an embodiment of the present invention.

In FIG. 1, a frame 10 of a bicycle is partially represented. A hub axle 12 is provided that rotatably mounted a rear wheel of the bicycle to the frame. The hub axle 12 is equipped with a set 14 of sprockets 16 (for clarity of depiction, only one such sprocket is generically depicted in FIG. 1) of varying sizes. A drive chain 18 is provided that connects the set 14 of rear sprockets with front disks of the bicycle that are driven by and connected to pedals of the bicycle in a known manner.

As depicted in FIG. 1, a rear derailleur device 30 according to an embodiment of the present invention is provided on the bicycle. The rear derailleur device 30 includes a gear changing device 32 that is configured to control the shifting of gears of the bicycle by selectively changing which rear sprocket 16 is engaged to the drive chain 18 by moving the drive chain 18 in a direction substantially parallel to an axis of the hub axle 12. The rear derailleur device 30 further includes a tension device 50 that maintains the tension of the drive chain 18 as the gears of bicycle are shifted by changing which rear sprocket 16 is engaged to the drive chain 18. In this embodiment, the gear changing device 32 is provided at a location that is rearward of the tension device 50 in terms of the orientation of the bicycle.

In the embodiment depicted in FIG. 1, the gear changing device 32 and the tension device 50 are both mounted to a mounting frame 35, which is mounted to the frame 10 of the bicycle by a first mounting unit 36 and a second mounting unit 38. Alternatively, the gear changing device 32 and the tension device 50 can be separately mounted to the frame 10 of the bicycle, as is the case in the embodiment depicted in FIGS. 4A and 4B.

A control cable (see, e.g. cable 20 in FIG. 4A) is connected to the gear changing device 32 of the rear derailleur 30, and the control cable allows a rider to control the operation of the gear changing device 32 (i.e., selectively shift gears using the rear derailleur 30) using a control device that can be mounted on a handlebar assembly of the bicycle. The gear changing device 32 includes a chain guide wheel (or sprocket) 34. The gear changing device 32 is configured and mounted in such a way so that the drive chain 18, which extends around and is engaged to the rear sprocket 16, then extends over a top of the chain guide wheel 34 and is engaged to teeth on the chain guide wheel 34. The gear changing device 32 controls the shifting of gears of the bicycle by moving the chain guide wheel 34 in a direction substantially parallel to the axis of the hub axle 12, which allows the chain guide wheel 34 to guide the drive chain 18 (as it is driven by the rider) out of engagement with one sprocket and into engagement with another sprocket that is aligned with the new orientation of the chain guide wheel.

The tension device 50 provides tension to the drive chain 18 to ensure that the drive chain 18 remains in engagement with a rear sprocket 16 and a front sprocket, which is driven in rotation by the rider using pedals. Due to the varying sizes of the sprockets (e.g., the rear sprockets 16), when the gears of the bicycle are changed, the drive chain 18 will have the tendency to slacken and tighten, and thus the tension device 50 is provided to account for this tendency and provide the drive chain 18 with a substantially consistent tension.

Figure 2A:
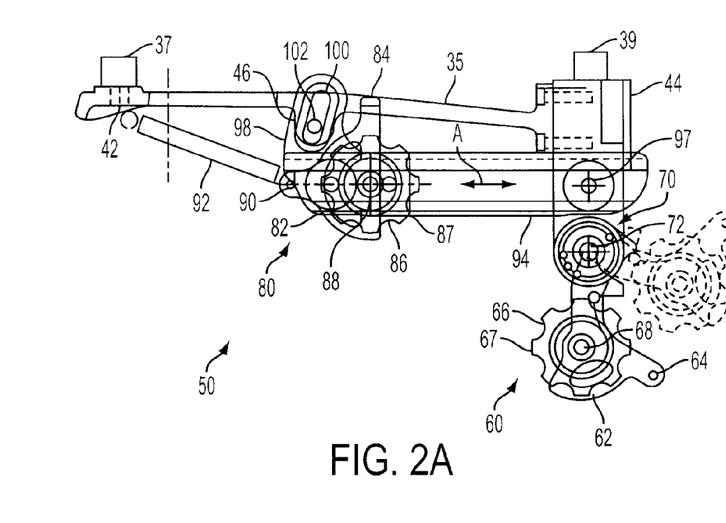
FIG. 2A is a front schematic view of the tension device according to the embodiment depicted in FIG. 1.
Figure 2B:
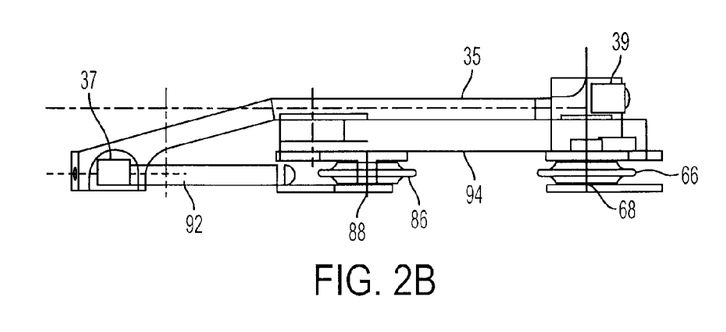
FIG. 2B is a top schematic view thereof.
Figure 2C:
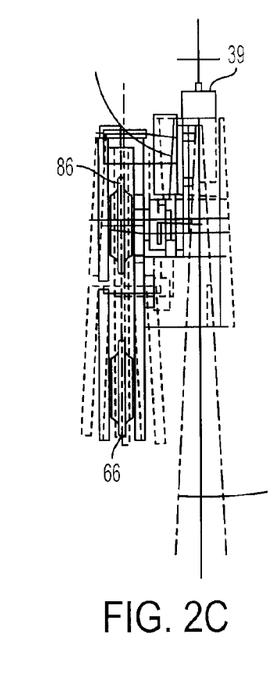
FIG. 2C is a right side schematic view thereof also showing a pendulum motion of the tension device.

The embodiment of the tension device 50 depicted in FIGS. 1-2C is mounted to or incorporated as part of the mounting frame 35. A rearward end of the mounting frame 35 includes a first bushing 37 that can be connected to the first mounting unit 36, which is mounted to the frame 10 of the bicycle. The first bushing 37 is preferably made of an impact absorbing and dampening material, such as rubber, to absorb and dampen impacts on any component attached to the mounting frame 35. A forward end of the mounting frame 35 includes a second bushing 39 that can be connected to the second mounting unit 38, which is mounted to the frame 10 of the bicycle. The second bushing 39 is also preferably configured to absorb and dampen impacts on any component attached to the mounting frame 35. The first bushing 37 and/or the second bushing 39 can be adjustably connected to the frame 10 of the bicycle.

The tension device 50 includes a first pulley device 60 and a second pulley device 80, as can be seen in the embodiment depicted in FIGS. 1-2C.

The first pulley device 60 includes a first cage 62 that includes a chain guide 64 at a bottom or forward side thereof. The first pulley device 60 further includes a first pulley (or wheel, or sprocket) 66 having chain engaging teeth 67 configured to receive the drive chain 18.

The first pulley 66 is rotatably mounted to the first cage 62 about an axis 68. The first pulley device 60 includes a pivot device 70, which is provided at a bottom end of a base member 44 that is rigidly connected to or part of the mounting frame 35. The pivot device 70 connects the first cage 62 to the mounting frame 35. The pivot device 70 is a spring-biased bearing, which is biased to pivot the first cage 62 in a counterclockwise direction (as viewed in FIGS. 1 and 2A) about axis 72. The first cage 62 has a protrusion 74 and the pivot device 70 a stop member 76, and as the first cage 62 pivots in the counterclockwise direction, the protrusion 74 will contact stop member 76 to prevent further pivoting. FIG. 2A depicts the first cage 62 in phantom lines in an orientation generally in the stop position where the protrusion 74 contacts the stop member 76.

The second pulley device 80 includes a second cage 82 that includes a chain guide 84 at a top thereof. The second pulley device 80 further includes a second pulley (or wheel, or sprocket) 86 having chain engaging teeth 87 configured to receive the drive chain 18. The configuration of the second cage 82 provides a compact design that protects the second pulley 86 and drive chain thereon from impacts caused by objects striking the rear derailleur device 30 during use of the bicycle. The second cage 82 is provided at a relatively high elevation from the ground to improve ground clearance as compared to other rear derailleurs.

The second pulley 86 is rotatably mounted to the second cage 82 about an axis 88. The second pulley device 80 also includes a slide device 94 that has a track (or channel) 95. The second cage 82 is slidably engaged to the track 95 of the slide device 94 such that the second cage 82 can linearly slide along the track 95 as shown by arrow A. While the second cage 82 can slide along the track 95, the second cage 82 is preferably prevented from rotating with respect to the track 95 and slide device 94. Also, the track 95 prevents the second cage 82 from moving with respect to the track 95 and slide device 94 in any direction perpendicular to the arrow A.

In this embodiment, the track 95 ends at a rearward end thereof, and a stop member 96 is preferably provided at a forward end of the slide device 94 to prevent the second cage 82 from sliding out of the track 95 of the slide device 94. The second pulley device 80 further includes a biasing member, such as tension spring 92, which biases the second cage 82 towards the rearward end of the track 95. In this embodiment, the tension spring 92 has a first end attached to a mounting member 42 that is provided on the mounting frame 35, and a second end attached to a mounting member (e.g., a hole or a pin) 90 at a rearward side of the second cage 82.

In the embodiment depicted in FIGS. 1-2C, the slide device 94 is mounted to the mounting frame 35 in an adjustable manner. A forward end of the slide device 94 is mounted to a base member 44 that is rigidly connected to or part of the mounting frame 35. The slide device 94 is mounted to the base member 44 such that the slide member 94 can be adjustably pivoted about axis 97. Additionally, the rearward end of the slide device 94 includes an adjustment portion 98 having a track or channel 100 that receives a threaded screw (or bolt) 102 therein. The threaded screw 102 is threadably engaged to a hole on a plate 46, which is rigidly connected to or part of the mounting frame 35. Thus, when the threaded screw 102 is loosened then an angle (see, e.g., angle α of the embodiment in FIG. 3) of the slide device 94 can adjusted since the screw 102 can slide along the track 100, but when the screw 102 is tightened then the screw 102 will clamp down on the adjustment portion 98 and prevent the slide device 94 from moving with respect to the mounting frame 35. The relative movement between the slide device 94 and the mounting frame 35 (i.e., adjustment of angle α) should be prevented during use of the bicycle; however, the angle can be adjusted during maintenance of the bicycle in order to adjust the angle of the linear movement along arrow A and the location and movement of the second pulley 86, which will vary the operational characteristics of the tension device 50.

The drive chain 18 extends around the front sprocket, then extends from a lower side of the front sprocket to an upper side of the second pulley 86 (beneath chain guide 84), then extends around a portions of the second pulley 86, then extends from a lower side of the second pulley 86 to an upper side of the first pulley 66, then extends around a portion of the first pulley 66, then extends from a lower side of the first pulley 66 to an upper side of the chain guide wheel 34, then extends around a portion of the chain guide wheel 34 to a lower side of the rear sprocket 16, then extends around a portion of the rear sprocket 16, and then extends from an upper side of the rear sprocket 16 to an upper side of the front sprocket, thereby completing the closed loop of the drive chain 18.

Thus, the first pulley 66 has a first rotational axis 68 that is swingable around a swing center or axis 72, and the first pulley 66 is forced by the pivot device 70 in a counterclockwise direction around the swing center 72 to apply tension to the drive chain 18, in this embodiment for example, by pivot device 70. The second pulley 86 has a second rotational axis 88 that is movable along a movable direction A to change a distance between the first rotational axis 68 and the second rotational axis 88, and thus, the distance between the first rotational axis 68 and the second rotational axis 88 is variable. The second pulley 86 is arranged to be forced along the moving direction A to apply tension to the drive chain 18, in this embodiment for example, by tension spring 92. In this embodiment, the second rotational axis 88 of the second pulley 86 is movable along a substantially straight line defined by the track 95 of the slide device 94. The first pulley 66 and the second pulley 86 are preferably arranged within a diameter of a rear wheel of the bicycle, as can be seen, for example, in the embodiment depicted in FIGS. 4A and 4B.

Figure 3:
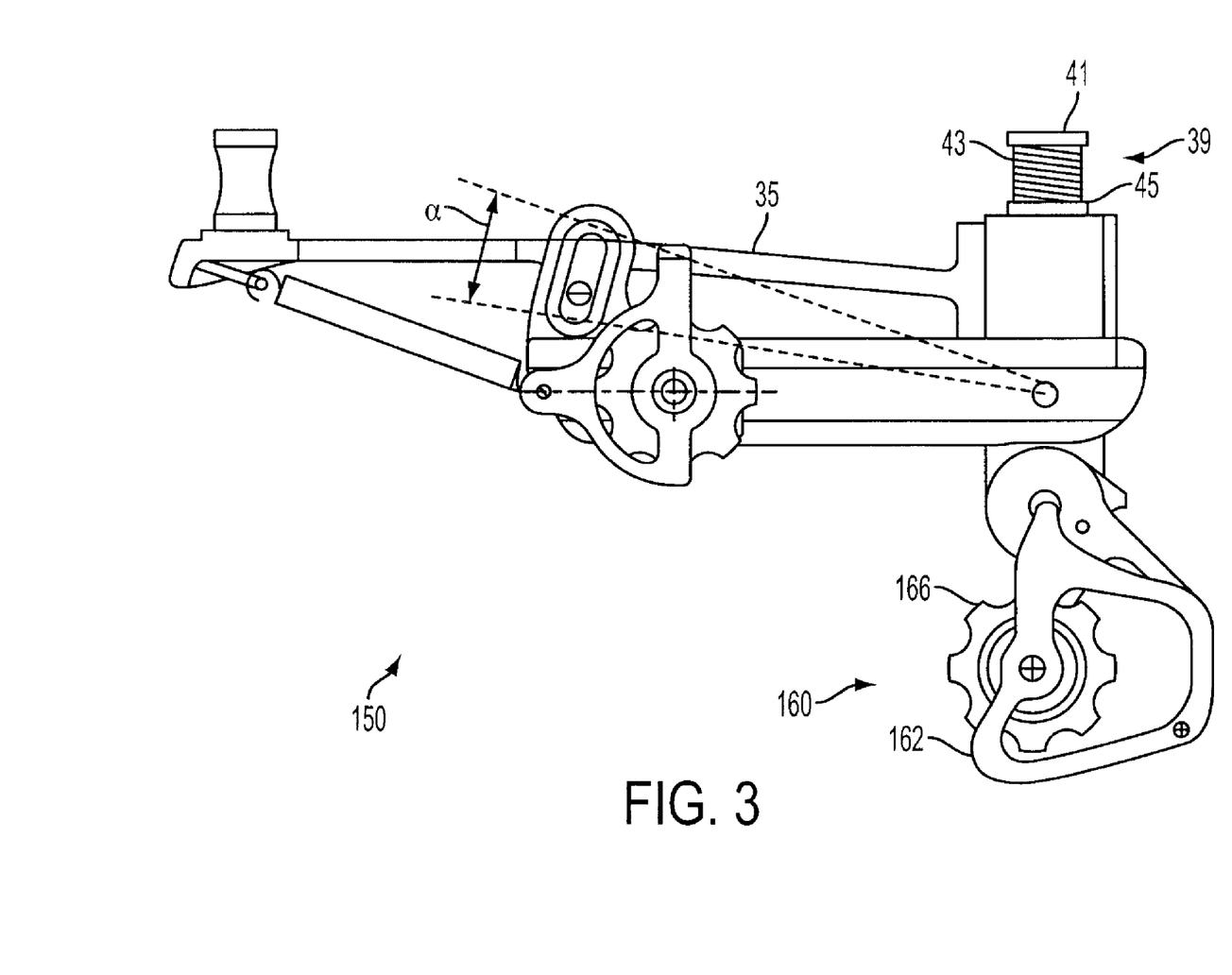
FIG. 3 is a schematic view of a tension device, according to another embodiment of the present invention.

FIG. 3 depicts another embodiment that includes a tension device 150, which is similar to the embodiment of the tension device 50 shown in FIGS. 1-2C. These two embodiments include different configurations of the first cage, where the embodiment of the first cage 162 of the first pulley device 160 in FIG. 3 includes a slightly larger configuration, than the first cage 62 in FIGS. 1-2C. Both embodiments of the first cage provide protection to their respective first pulley and drive chain thereon from impact caused by objects striking the rear derailleur device during use of the bicycle. The configuration of the first cage 162 in FIG. 3 provides a skid-resistant design that protects the first pulley 166 and drive chain thereon, and alleviates impact caused by objects striking the rear derailleur device during use of the bicycle.

The embodiment in FIG. 3 also includes the second bushing 39, which is shown in greater detail in FIG. 3 than in FIGS. 2A-2C, and therefore will be described further now. The second bushing 39 is adjustably and movably mounted to the second mounting unit using an adjustable, threaded member (e.g., screw, bolt, etc.) 40 (depicted in FIG. 1). The bolt 40 extends through a first member 41, which is rigidly connected to the second mounting unit, through a compression spring 43, and through a second member 45, which is rigidly connected to the mounting frame 35. (Note that washers can be provided between the first member 41 and the spring 43, and between the second member 45 and the spring 43.) The bolt 40 is threadably engaged to the mounting frame 35, and the first member 41 can slide along the bolt 40. The compression spring 43 biases the first member 41 away from the second member 45, and absorbs impacts and allows some movement of the mounting frame 35 caused by impacts on any component connected to the mounting frame 35 in order to prevent or reduce damage caused by such impacts. Due to the threaded engagement between the bolt and the mounting frame 35, rotation of the bolt 40 will adjust the maximum distance between the first member 41 and the second member 45, and adjust the pressure on the spring 43, thereby adjusting the operational characteristics thereof.

Figure 4A:
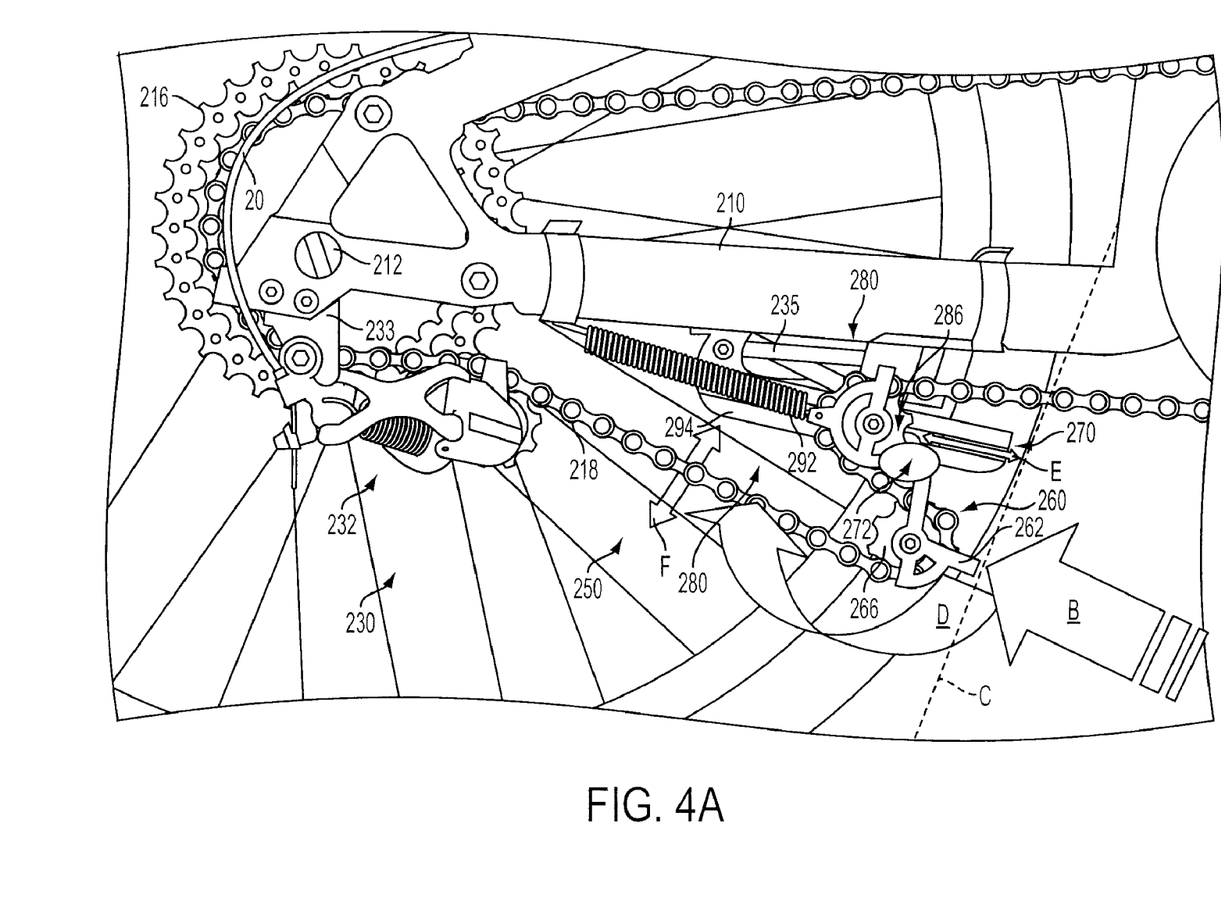
FIG. 4A is an elevational view of a rear derailleur device of a bicycle including a gear changing device and a tension device, according to an embodiment of the invention, and diagramming an impact force acting on the tension device and resulting reaction.
Figure 4B:
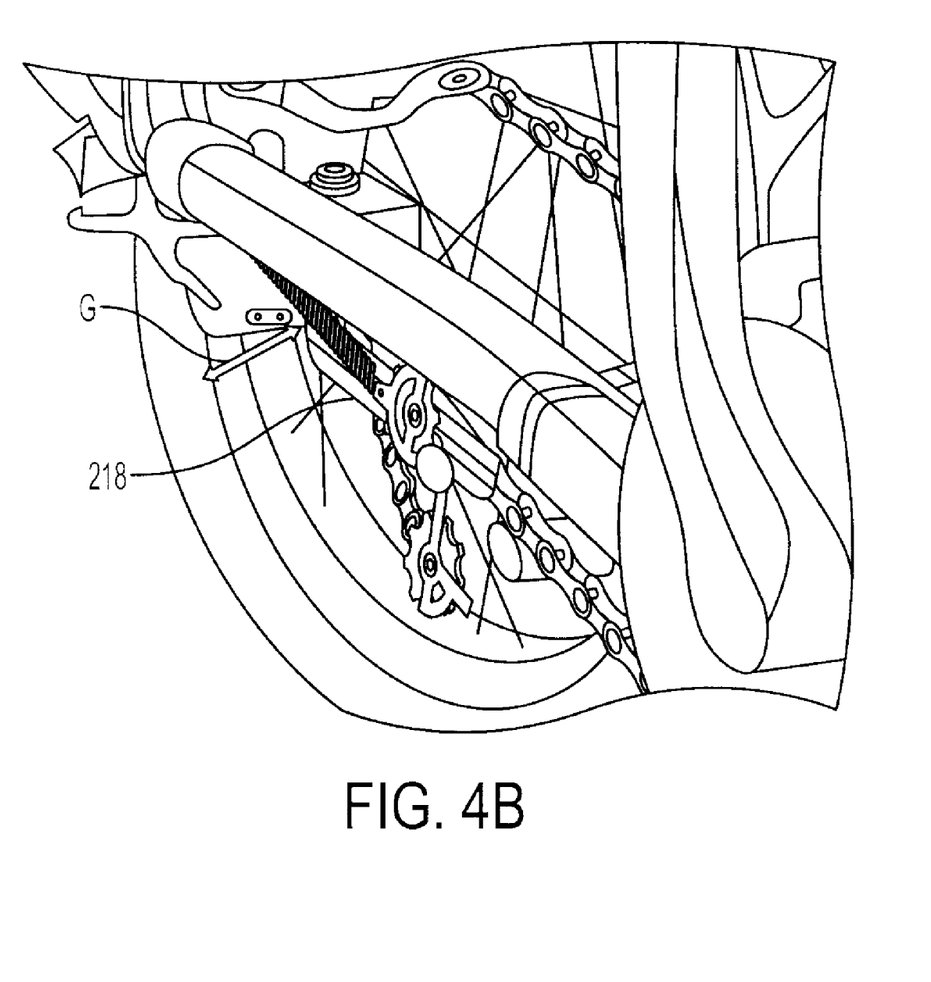
FIG. 4B is a perspective view of the rear derailleur device of FIG. 4A used to discuss a reaction of a drive chain resulting from the impact force acting on the tension device.

FIGS. 4A and 4B provide depictions of another embodiment of a rear derailleur device 230 according to the present invention. The rear derailleur device 230 includes a gear changing device 232 that is configured to control the shifting of gears of the bicycle by selectively changing which rear sprocket 216 is engaged to the drive chain 218. The rear derailleur device 230 further includes a tension device 250 that maintains the tension of the drive chain 218 as the gears of bicycle are shifted by changing which rear sprocket 216 is engaged to the drive chain 218. In this embodiment, the gear changing device 232 and the tension device 250 are separately mounted to the frame 210 of the bicycle. The gear changing device 232 is mounted using bracket 233 to the frame 210 at a location adjacent to the hub axle 212, while the tension device 250 is mounted to a mounting frame 235, which is mounted to the frame 210 of the bicycle.

Figure 6A:
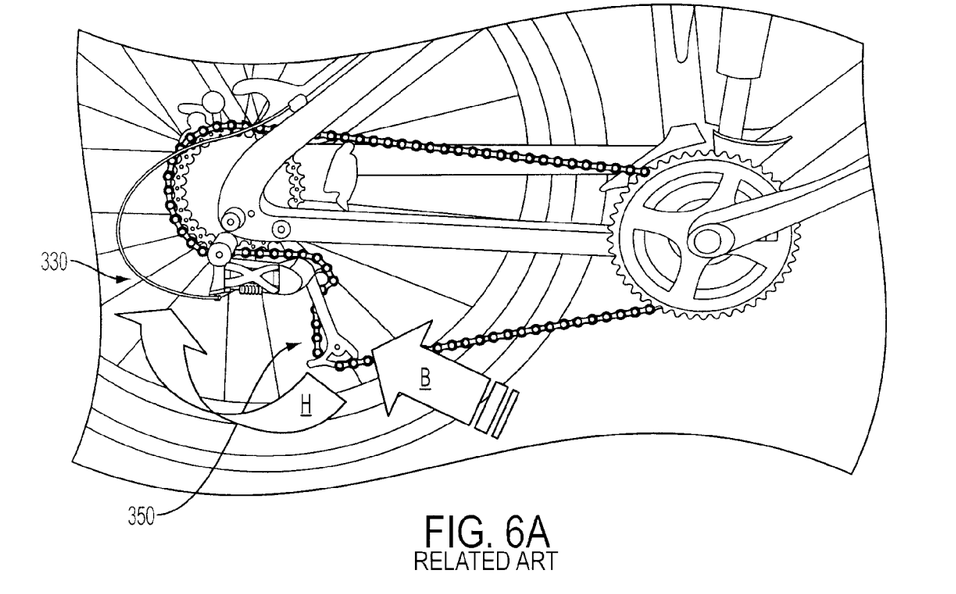
FIG. 6A is an elevational view of a rear derailleur device of a bicycle according to a related art design, and diagramming an impact force acting on a tension device of the rear derailleur and resulting reaction.

The tension device 250 includes a first pulley device 260 and a second pulley device 280. FIGS. 4A and 4B depict an embodiment of the first cage 262 of the first pulley device 260 that is similar in configuration to the first cage depicted in FIGS. 1-2C. FIGS. 4A and 4B depict a situation in which an impact force, as represented by arrow B in FIG. 4A, strikes against the first cage 262 of the tension device 250 in a direction perpendicular to line C. FIGS. 4A and 4B are diagrams used to explain the reaction of the tension device 250 to an object striking the tension device, thereby generating the impact force B. When the impact force B strikes the first cage 262, the pivot device 270 will allow the first pulley 266 to pivot about axis 272 (as shown by arrow D in FIG. 4A) and will absorb some of the impact forces and prevent damage to the tension device 250. Additionally, the spring 292 will pull against the second pulley 286 linearly moving along the slide device 294 (as shown by arrows E in FIG. 4A) in order to absorb any slack and release any tension in the drive chain 218 caused by the impact and pivoting of the first pulley 266. Furthermore, the location of the tension device 250 at about mid-way between the gear changing device 232 and the front sprocket of the bicycle ensures that the expanse of unsupported drive chain 218 (i.e., the length of chain 218 extending between device 232 and device 260, and the length of chain 218 extending between the device 280 and the front sprocket) is minimized, as compared to other designs (see, e.g., the long expanse of chain between a tension device 350 thereof and the front sprocket in FIG. 6A). The above factors beneficially reduce the flopping movement (as shown using arrows F in FIG. 4A) of the chain 218 during the impact and absorption of the impact force, as compared to other designs.

In addition to the above benefits, the rear derailleur device 230 of the embodiment of the present invention allows for a reduction in the size and weight of the device adjacent the rear sprocket 216. For example, note that the gear changing device 232 is smaller in size and weight than the rear derailleur 330 in FIG. 6A. Additionally, the rear derailleur device 230 of the embodiment of the present invention reduces or prevents entanglement of the drive chain with the gear changing device 232 when the tension device 250 pivots due to impact. However, in the design shown in FIG. 6A, the rearward pivoting (as shown by arrow H) of the tension device 350 can result in entanglement of the drive chain with the remainder of the rear derailleur 330.

Figure 6B:
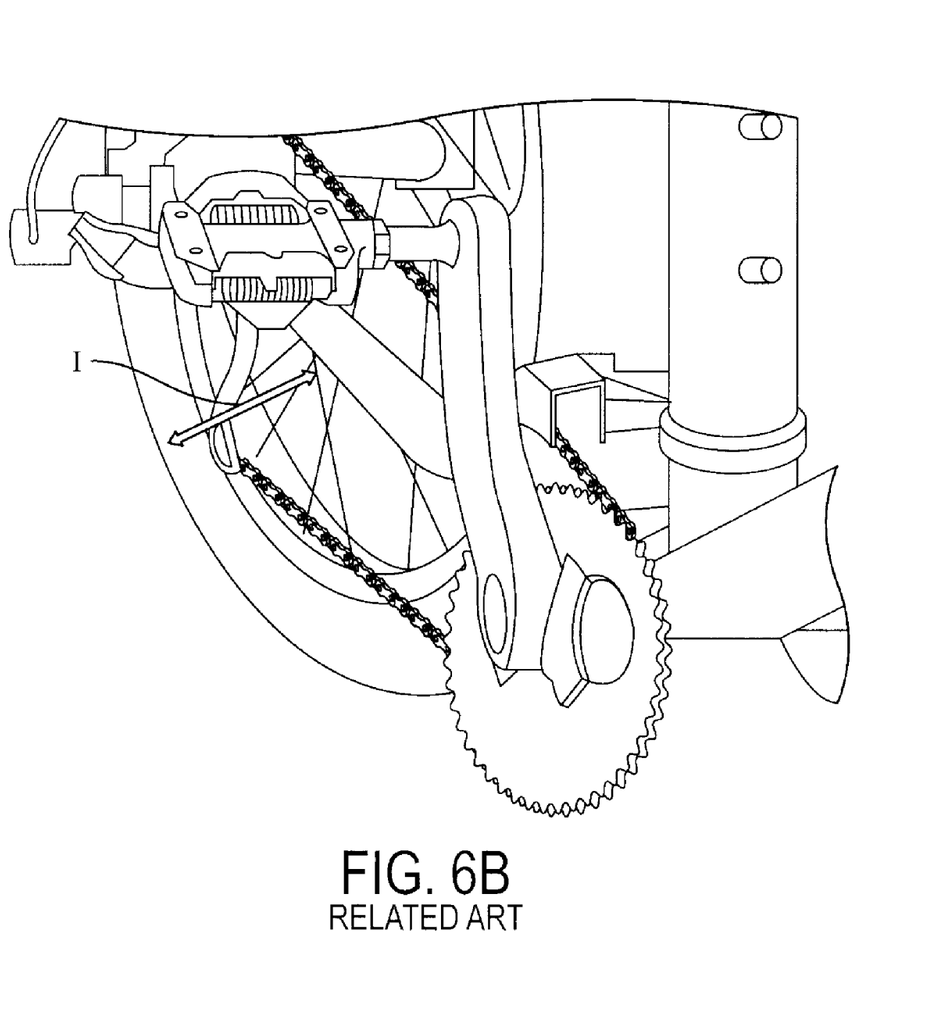
FIG. 6B is a perspective view of the rear derailleur device of FIG. 6A used to discuss a reaction of a drive chain resulting from the impact force acting on the tension device.

Additionally, when viewed from the front of the bicycle (see generally, FIG. 4B), the rear derailleur 230 maintains a close distance from the rear wheel of the bicycle, and does not bulge outward therefrom. Therefore, the tension device 250 can actually act to prevent objects from striking and damaging the tire. Additionally, the compact nature of the rear derailleur 230, the configuration and operation of the tension device 250, and reduction in length of unsupported expanses in the drive chain 218 also act to reduce the amount of horizontal flopping movement (as shown using arrows G in FIG. 4B) of the chain 218 during the impact and absorption of the impact force, as compared to other designs (as shown using arrows I in FIG. 6B).

Figure 5:
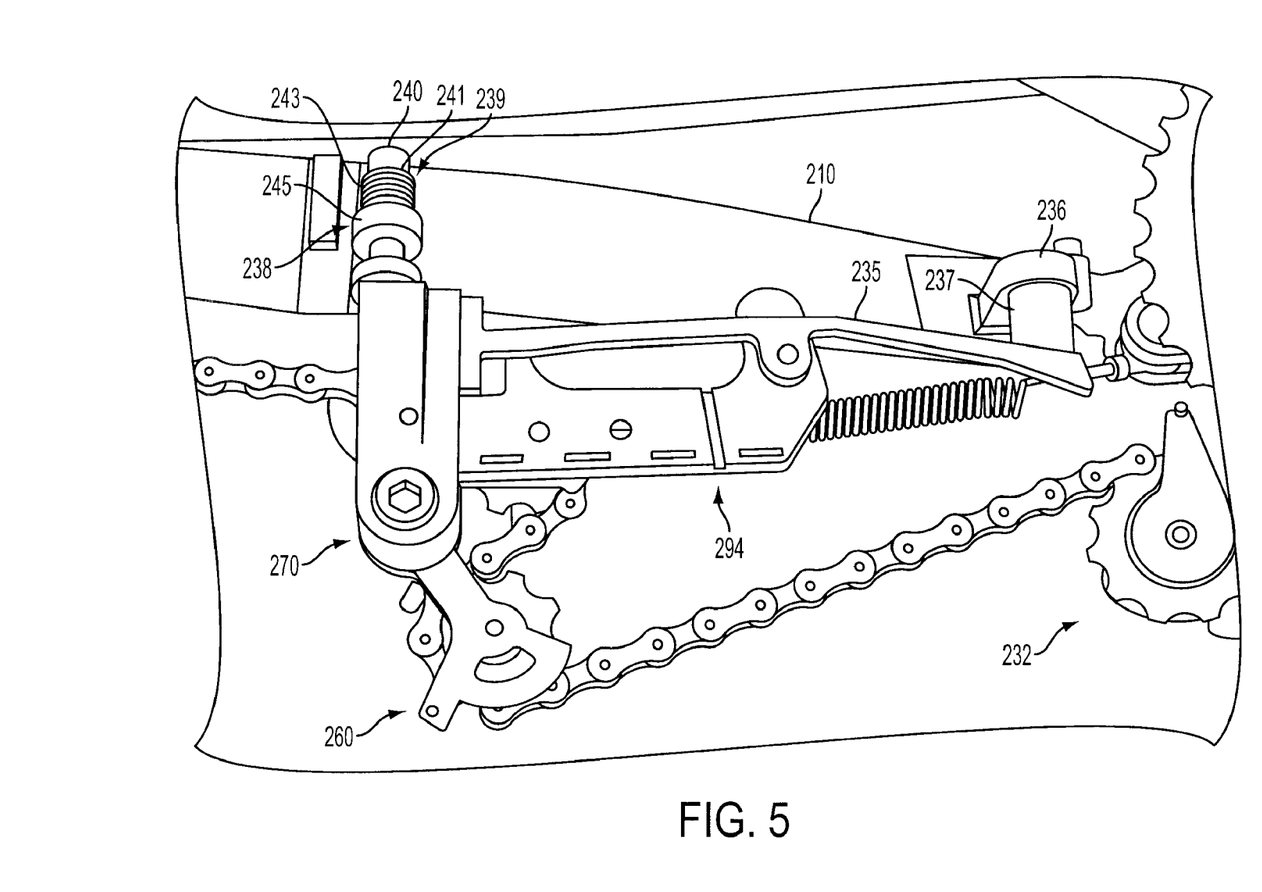
FIG. 5 is a rear elevational view of a mounting structure of the tension device of FIG. 4A.

FIG. 5 depicts a rear view of the mounting of the tension device 250 depicted in FIGS. 4A and 4B to the frame 210 of the bicycle. The mounting frame 235 includes a first bushing 237 that is connected by a bolt to the first mounting unit 236, which is mounted to the frame 210 of the bicycle. The mounting frame 235 also includes a second bushing 239 that can be connected to the second mounting unit 238, which is mounted to the frame 210 of the bicycle. The second bushing 239 is adjustably and movably mounted to the second mounting unit 238 using an adjustable, threaded screw or bolt 240 that extends through a first member 241, which is rigidly connected to the second mounting unit 238, through a compression spring 243, and through a second member 245, which is rigidly connected to the mounting frame 235. The compression spring 243 biases the first member 241 away from the second member 245, and absorbs impacts and allows some movement of the mounting frame 235 caused by impacts on any component connected to the mounting frame 235 in order to prevent or reduce damage caused by such impacts. Due to the threaded engagement between the bolt 240 and the mounting frame 235, rotation of the bolt 240 will adjust the maximum distance between the first member 241 and the second member 245, and adjust the pressure on the spring 243, thereby adjusting the operational characteristics thereof.

The first bushing 237 and the second bushing 239 reduce friction and sound caused by the interconnection between the mounting frame 235 and the frame 210 of the bicycle. Additionally, the first bushing 237 and the second bushing 239 allow the mounting frame and thus the tension device to swing as a pendulum about an axis that generally extends horizontally from the front to the rear of the bicycle through the second bushing. The first bushing also allows for such movement. As can be seen in FIG. 2C, for example, the mounting of the first bushing and the second bushing can allow the mounting frame and thus the tension device to swing as a pendulum, which will allow the tension device to change angular orientation about that axis to follow the changing of gears. Thus, as the gear changing device moves in a direction parallel to the axis of the rear wheel in order to change which rear sprocket the drive chain is engaged to, the first and second bushings will allow the tension device to swing as a pendulum to follow such movement. As the gears are changed, the drive chain will pull the tension device such that the first pulley will move toward alignment with or be in alignment with the chain guide wheel of the gear changing device. This pendulum movement of the tension device will advantageously reduce friction on the chain guide wheel and first pulley by the drive chain, and will also reduce noise caused by such friction.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A tension device for a drive chain of a bicycle, the tension device comprising:
   a first pulley having a first rotational axis swingable around a swing center, the first pulley being arranged to be forced around the swing center to apply tension to the drive chain;
   a second pulley having a second rotational axis movable along a movable direction to change a distance between the first rotational axis and the second rotational axis, the second pulley being arranged to be forced along the moving direction to apply tension to the drive chain; and
   a mounting frame configured to be mounted to a frame of the bicycle,
   wherein the first pulley is mounted to the mounting frame such that the first pulley can pivot about an axis of the swing center, and
   wherein the first rotational axis and the axis of the swing center are parallel to and offset from each other.

2. The tension device according to claim 1, wherein the first pulley and the second pulley are arranged within a diameter of a rear wheel of the bicycle.

3. The tension device according to claim 1,
   wherein the second pulley is slidably mounted to the mounting frame.

4. The tension device according to claim 3, further comprising a slide device configured to be mounted to the mounting frame and slidably support the second pulley.

5. The tension device according to claim 4, further comprising a biasing member configured to bias the second pulley such that the second rotational axis is biased to move in the movable direction along the slide device away from the first rotational axis.

6. The tension device according to claim 4, wherein the slide device is adjustably mounted to the mounting frame such that an angle of the movable direction with respect to the mounting frame can be angularly adjusted by pivoting the slide device about an axis.

7. The tension device according to claim 3, wherein:
   the mounting frame includes at least one bushing configured to adjustably mount the mounting frame to the frame of the bicycle;
   the bushing is configured to absorb and dampen an impact force acting on the tension device; and
   the at least one bushing is configured to allow the tension device to swing with respect to the frame of the bicycle about an axis extending generally from a front of the bicycle to a rear of the bicycle and through the at least one bushing.

8. A tension device for a drive chain of a bicycle, the tension device comprising:
   a first pulley having a first rotational axis swingable around a swing center, the first pulley being arranged to be forced around the swing center to apply tension to the drive chain;
   a second pulley having a second rotational axis movable along a movable direction to change a distance between the first rotational axis and the second rotational axis, the second pulley being arranged to be forced along the moving direction to apply tension to the drive chain; and
   a mounting frame configured to be mounted to a frame of the bicycle, wherein:
   the first pulley is mounted to the mounting frame such that the first pulley can pivot about the swing center;
   the first rotational axis is offset from the swing center;
   the second pulley is slidably mounted to the mounting frame;
   the mounting frame includes a bushing configured to adjustably mount the mounting frame to a first member on the frame of the bicycle;

the bushing includes a second member, a compression spring, and a threaded member;
the threaded member is configured to extend through a hole in the first member and be in threaded engagement to a hole in the second member; and
the compression spring is configured to be provided in between the first member and the second member, and to bias the second member in a direction away from the first member.

9. A tension device for a drive chain of a bicycle, the tension device comprising:
a first pulley having a first rotational axis swingable around a swing center, the first pulley being arranged to be forced around the swing center to apply tension to the drive chain; and
a second pulley having a second rotational axis movable along a movable direction to change a distance between the first rotational axis and the second rotational axis, the second pulley being arranged to be forced along the moving direction to apply tension to the drive chain,
wherein the tension device is configured to be mounted to a frame of the bicycle separately from a gear changing device of a derailleur device of the bicycle.

10. A derailleur device for a drive chain of a bicycle, the derailleur device comprising:
a gear changing device configured to change a sprocket to which the drive chain is engaged; and
a tension device including:
a first pulley having a first rotational axis swingable around a swing center and arranged to be forced to apply tension to the drive chain,
a second pulley having a second rotational axis and arranged to be forced to apply tension to the drive chain, a distance between the first rotational axis and the second rotational axis being variable, and
a mounting frame configured to be mounted to a frame of the bicycle,
wherein the first pulley is mounted to the mounting frame such that the first pulley can pivot about an axis of the swing center, and
wherein the first rotational axis and the axis of the swing center are parallel to and offset from each other.

11. The derailleur device according to claim 10, wherein the tension device further comprises:
means for forcing the first pulley to swing around the swing center that is offset from the first rotational axis; and
means for forcing the second pulley to slide in a direction away from the first pulley.

12. The derailleur device according to claim 10, wherein the tension device further comprises means for adjustably mounting the tension device to a frame of the bicycle,
wherein the means for adjustably mounting is configured to absorb and dampen an impact force acting on the tension device, and
wherein the means for adjustably mounting is configured to allow the tension device to swing with respect to the frame of the bicycle about an axis extending generally from a front of the bicycle to a rear of the bicycle.

13. A derailleur device for a drive chain of a bicycle, the derailleur device comprising:
a gear changing device configured to change a sprocket to which the drive chain is engaged; and
a tension device including:
a first pulley having a first rotational axis and arranged to be forced to apply tension to the drive chain, and
a second pulley having a second rotational axis and arranged to be forced to apply tension to the drive chain, a distance between the first rotational axis and the second rotational axis being variable,
wherein the tension device is configured to be mounted to a frame of the bicycle separately from the gear changing device.

14. A tension device for a drive chain of a bicycle, the tension device comprising:
a first pulley having a first rotational axis swingable around a swing center, the first pulley being arranged to be forced around the swing center to apply tension to the drive chain;
a second pulley having a second rotational axis movable along a substantially straight line, the second pulley being arranged to be forced along the substantially straight line to apply tension to the drive chain; and
a mounting frame configured to be mounted to a frame of the bicycle,
wherein the first pulley is mounted to the mounting frame such that the first pulley can pivot about an axis of the swing center, and
wherein the first rotational axis and the axis of the swing center are parallel to and offset from each other.

15. The tension device according to claim 14, wherein the first pulley and the second pulley are arranged within a diameter of a rear wheel of the bicycle.

16. The tension device according to claim 14, further comprising:
a slide device configured to be mounted to the mounting frame and slidably support the second pulley along the substantially straight line.

17. The tension device according to claim 16, further comprising a biasing member configured to bias the second pulley such that the second rotational axis is biased to move in the substantially straight line along the slide device away from the first rotational axis.

18. The tension device according to claim 16, wherein the slide device is adjustably mounted to the mounting frame such that an angle of the substantially straight line with respect to the mounting frame can be angularly adjusted by pivoting the slide device about an axis.

19. The tension device according to claim 16, wherein:
the mounting frame includes at least one bushing configured to adjustably mount the mounting frame to the frame of the bicycle;
the bushing is configured to absorb and dampen an impact force acting on the tension device; and
the at least one bushing is configured to allow the tension device to swing with respect to the frame of the bicycle about an axis extending generally from a front of the bicycle to a rear of the bicycle and through the at least one bushing.

20. A tension device for a drive chain of a bicycle, the tension device comprising:
a first pulley having a first rotational axis swingable around a swing center, the first pulley being arranged to be forced around the swing center to apply tension to the drive chain;
a second pulley having a second rotational axis movable along a substantially straight line, the second pulley being arranged to be forced along the substantially straight line to apply tension to the drive chain, a mounting frame configured to be mounted to a frame of the bicycle; and
a slide device configured to be mounted to the mounting frame and slidably support the second pulley along the substantially straight line, wherein:

the first pulley is mounted to the mounting frame such that the first pulley can pivot about the swing center;

the first rotational axis is offset from the swing center;

the mounting frame includes a bushing configured to adjustably mount the mounting frame to a first member on the frame of the bicycle;

the bushing includes a second member, a compression spring, and a threaded member;

the threaded member is configured to extend through a hole in the first member and be in threaded engagement to a hole in the second member; and the compression spring is configured to be provided in between the first member and the second member, and to bias the second member in a direction away from the first member.

* * * * *